2,897,115
PROCESS FOR EXTRACTING AND RECONSTITUTING WITCH HAZEL

Matthew Edward Dullaghan, Wilmington, Del., and Harold Robert Hochstadt, Fresh Meadows, N.Y., assignors to Humphreys Medicine Company, Inc., New York, N.Y., a corporation of New York No Drawing. Application October 28, 1955
Serial No. 543,610

6 Claims. (Cl. 167—62)

This invention relates to the production of witch hazel and is more particularly concerned with a method for the concentration and reconstitution of witch hazel.

In the production and handling of witch hazel, it has been difficult to obtain widespread distribution and large markets due to the bulk and weight of the witch hazel and the containers. Witch hazel is a comparatively low priced merchandise since a large portion of it is alcohol and water and, therefore, must compete with other low priced merchandise in the same field, thus the shipping weight and bulk have made its distribution, except in comparatively local markets, a difficult problem and a limiting factor in developing widespread distribution of witch hazel.

Various attempts have been made to concentrate witch hazel by distillation at atmospheric pressure or by vacuum distillation, but these attempts have ended in failure due to the characteristic of the witch hazel essence, whereby the distillate has lost the witch hazel characteristics. Others have attempted to make extracts of the witch hazel by concentration, but this was found impractical in that it was impossible to reconstitute the concentrate into a suitable witch hazel. Since commercial witch hazel is 14% alcohol by volume, extraction with water-immiscible solvents is not easily accomplished. On the other hand, witch hazel water (without the usual 14% alcohol of the commercial witch hazel) may be extracted with certain solvents. However, after the removal of the solvents, the residues, which did have a witch hazel odor, were insoluble in alcohol, water or intermediate mixtures of alcohol and water.

In the manufacture of witch hazel, the principal method employed provides for charging the witch hazel brush, which is freshly cut and chopped into pieces of a size for convenient handling, into large kettles. Steam is then passed through the kettles and the distillates are collected in a common receiver. Generally, ethyl alcohol is co-condensed with the stream of one of the kettles, so that the resulting distillates have an alcohol content by volume of about 14%. After being thoroughly mixed, the distillates are filtered and then stored in wooden barrels and are then ready for commercial use.

In the method of the present invention, means have been found to concentrate the witch hazel essence and then to reconstitute the product from the concentrated essence. The end product produced in accordance with the method of this invention and from the concentrate, compares favorably with the commercial witch hazel produced by the standard processes. To obtain the concentrated essence of witch hazel, in accordance with the method of this invention, aqueous witch hazel distillate is preferably employed. The witch hazel water is then charged into a vessel equipped with a stirrer and a condenser and is then mixed within said vessel with an adsorbent material such as activated carbon preferably in a proportion of from one-tenth of one percent to one percent activated carbon (weight by weight) in the witch hazel water. The ingredients are stirred and mixed for a period of more than five minutes and preferably about 30 minutes at room temperature, as it has been found that heating is not necessary, and the witch hazel will be readily adsorbed in the activated carbon in temperatures ranging from room temperature to 100° C. The suspension of activated carbon is then separated from the liquid by any of the usual methods such as by centrifuge or by filtering. The resulting carbon odorant adsorbate, which is in the form of a cake will be found to have adsorbed the essence from the witch hazel water and may then be stored in air-tight containers for shipment or storage.

Alternatively, the witch hazel water may be allowed to percolate through a bed of carbon, for example, in a column to produce the carbon odorant adsorbate. Depending upon the efficiency of the particular equipment employed, one, two or three cycles may be necessary for complete removal of the witch hazel essence from the witch hazel water.

While it has been found that the essence remains stable in the carbon cake for long periods of time when stored in open air at room temperatures, it is preferable that the adsorbent be maintained in air-tight containers to prevent either adsorption or absorption of foreign odors that might affect the witch hazel essences. Witch hazel essence adsorbed on the activated carbon when stored as above remains stable and strong after several months of storage. The adsorbent employed in this process is preferably activated carbon, although other carbons, such as charcoal, animal charcoal and powdered willow charcoal also have been found to adsorb the witch hazel essence. The adsorbed carbon prepared as above may then be stored for further use or may be shipped to all parts of the world where it can be reconstituted. The shipping of the adsorbed carbon is so economical and simple that distribution will be greatly facilitated.

To reconstitute the witch hazel from the carbon odorant adsorbate in accordance with the method of this invention, the adsorbate is eluted by mixing it in a flask equipped with a condenser with 95% ethanol. The mixing may be at room temperature since it has been found that the elution of the essence of witch hazel from the adsorbate takes place readily in temperatures ranging from room temperature to 78° C., the boiling point of the alcohol. The elution is quickly completed and the mixing of the ethanol with the adsorbate needs only ten minutes or more. It has been found that the elution is complete within an hour. The preferred proportions in the elution step are approximately 15.75 gallons of 95% ethanol or grain alcohol of 95% purity to 2½ pounds of the carbon odorant adsorbate on a dry basis. When the mixing has been completed, the liquid should be collected by filtration or by a centrifuge to press the carbon cake dry. After the carbon cake is dry, it is then washed with 85 gallons of water and the wash water is then separated from the carbon cake. The wash water and the alcohol are combined to give a witch hazel of about 15% alcohol, and having the characteristic witch hazel essence.

In the elution step, 95% ethanol has been employed but it is obvious that this ingredient may be varied as to the percentage of purity. Witch hazel has been eluted from the adsorbate when the alcohol concentration has been as low as 50%. However, it is believed that the best results are attained in the use of the 95% ethanol.

Samples of the eluted witch hazel prepared in accordance with this invention compared favorably with commercial witch hazel when the comparisons were made by sensory panel judges who were both highly trained, and by observers who had no special training in the essence field.

Since the carbon odorant adsorbate having the witch hazel essence must be stored either during shipment or before elution, the question of its stability has been investigated. It was found that the samples of the witch hazel adsorbate stored in the conventional screw cap jars and stored in temperatures and humidity subject to the normal variations did not show any appreciable loss of witch hazel essence upon reconstitution.

An example of the production of the adsorbate and the reconstitution of the witch hazel from the adsorbate was as follows:

A 120 liter flask equipped with a condenser was charged with 20 kilograms of witch hazel brush and 40 liters of water. After allowing to stand for 12 hours, and additional 10 liters of water was added to the flask and the mixture was distilled. The distillate was collected and this constituted the witch hazel water. This witch hazel water was found to be stable and showed no loss of essence or instability after storage of several months at room temperature. By adding approximately 15 ml. of 95% ethanol to 85 ml. of witch hazel water, a product similar to commercial witch hazel was produced.

To produce the carbon odorant adsorbate, 100 gallons of witch hazel water was placed in a flask having a condenser and mixed with 2.5 pounds of an activated carbon derived from lignite. The carbon was suspended by stirring it in the witch hazel water for about 30 minutes at room temperature. The mixture was then placed in a centrifuge whereby the liquid and the activated carbon were separated. The carbon which had adsorbed the essence of the witch hazel is then ready for storage or shipment. The remaining liquid separated from the carbon odorant adsorbate retained none of the witch hazel essence.

In reconstituting the witch hazel from the carbon cake produced above, the carbon cake was stirred in a flask containing 15.75 gallons of 95% ethanol for a period of twenty minutes at room temperature. The mixture was then separated by filtration and the carbon cake was washed with 85 gallons of water. The alcohol filtrate and the water wash were then combined to make a witch hazel of between 14% and 15% alcohol content and having the characteristic witch hazel essence.

If the amount of alcohol had been reduced by evaporation to below 14% by volume, more may be added to bring the concentration to the desired 14%. Little or no odor of witch hazel remained in the carbon cake after reconstitution.

In another case, 100 gallons of witch hazel water was charged in a flask having a condenser and mixed with 2.0 pounds of activated carbon derived from coal at room temperature for a period of 60 minutes. The mixture was then filtered through a filter press which yielded a carbon cake into which the essence from the witch hazel water had been adsorbed. The carbon cake was then dewatered by passing dry air through while still in the filter press. It was found that the essence of the witch hazel had disappeared from the witch hazel water. The carbon cake is then ready for storage or reconstitution as desired.

In reconstituting the witch hazel from the carbon cake produced as above, the carbon cake having the adsorbed witch hazel essence was transferred to a 20 gallon closed tank where 15.75 gallons of 95% grain alcohol was added. The suspension was agitated vigorously for 10 minutes at 40° C. The resultant slurry was then placed in a pressure filter and the filtrate was collected in a tank. The carbon cake was dried by passing dry air through and then washed with 85 gallons of water. The cake was found to be free of witch hazel odor or alcohol. The filtrates and the wash water were then combined and thoroughly mixed. The resulting solution was found to be reconstituted witch hazel having an alcohol content of approximately 15% and having the characteristic odor of witch hazel. The reconstituted witch hazel was clear and colorless and had the witch hazel odor and taste.

It has not been clearly established whether the process is one of adsorption or absorption, but it is unnecessary to determine the mechanism in order to carry out the process. For convenience, however, we will refer herein to the process as adsorption.

Examples have been given in the above specification for illustration only, and should not be deemed as limitations of the methods. By this invention, witch hazel may be extracted and reconstituted in such a manner as to eliminate many of the problems of world-wide distribution that had hampered a broad sale of witch hazel products. By adsorbing the witch hazel essence on a light weight adsorbent material, such as activated carbon, the essence may be shipped or stored in light or small containers for use in all parts of the world either for reconstitution into witch hazel or for use of the essence for flavoring purposes. In this way, the cost of expensive containers as are used for witch hazel, the high freight and storage costs will be avoided. In addition, there are many countries where the customs duties on products such as witch hazel are calculated by weight including the containers and the high duties thus prevent use of witch hazel in such countries. On the other hand, in the shipment of the light carbon adsorbate which may be eluted inside each country or in or near local markets, the duties and costs of shipment and storage will be greatly reduced.

We claim:

1. The method of extracting and reconstituting witch hazel which comprises mixing activated carbon with witch hazel water substantially free of alcohol to adsorb the witch hazel essence from the water, separating the carbon odorant adsorbate from the liquid, eluting the witch hazel essence from the carbon odorant adsorbate by mixing said adsorbate with 50% to 95% ethanol, separating the eluted solution from the carbon and adding water to the eluted solution.

2. The method of extracting and reconstituting witch hazel which comprises mixing activated carbon with witch hazel water substantially free of alcohol to adsorb the witch hazel essence from the water, separating the carbon odorant adsorbate from the liquid, eluting the witch hazel essence from the carbon odorant adsorbate by mixing said adsorbate with aqueous alcohol containing 50% or more ethanol, separating the eluted solution from the carbon adsorbate and adding water to the eluted solution.

3. A new composition of matter consisting essentially of activated carbon odorant adsorbate in which the adsorbed material is witch hazel.

4. A new composition of matter consisting essentially of activated carbon odorant adsorbate of the essence of witch hazel.

5. The method of reconstituting witch hazel from an activated carbon odorant adsorbate of witch hazel which comprises eluting the witch hazel essence from the adsorbate by mixing said adsorbate with an aqueous alcohol solution containing 50% or more ethanol, separating the eluted solution from the carbon, and adding water to the eluted solution.

6. The method of producing an activated carbon odorant adsorbate of witch hazel which comprises mixing activated carbon with witch hazel water substantially free of alcohol to adsorb the witch hazel essence from the water, and separating the activated carbon odorant adsorbate from the liquid.

References Cited in the file of this patent

UNITED STATES PATENTS

| | | |
|---|---|---|
| 1,999,499 | Burgess | Apr. 30, 1935 |
| 2,066,946 | Reiman | Jan. 5, 1937 |
| 2,359,443 | Schivek | Oct. 3, 1944 |
| 2,546,267 | Kuehl | Mar. 27, 1951 |
| 2,563,794 | Rickes et al. | Aug. 7, 1951 |